April 18, 1939. P. W. DIETMANN 2,155,118
MATCH PACKET MANUFACTURING MACHINE AND METHOD
Filed May 7, 1936 3 Sheets-Sheet 1
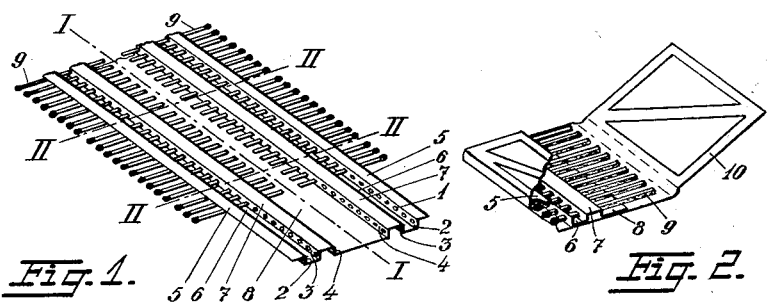
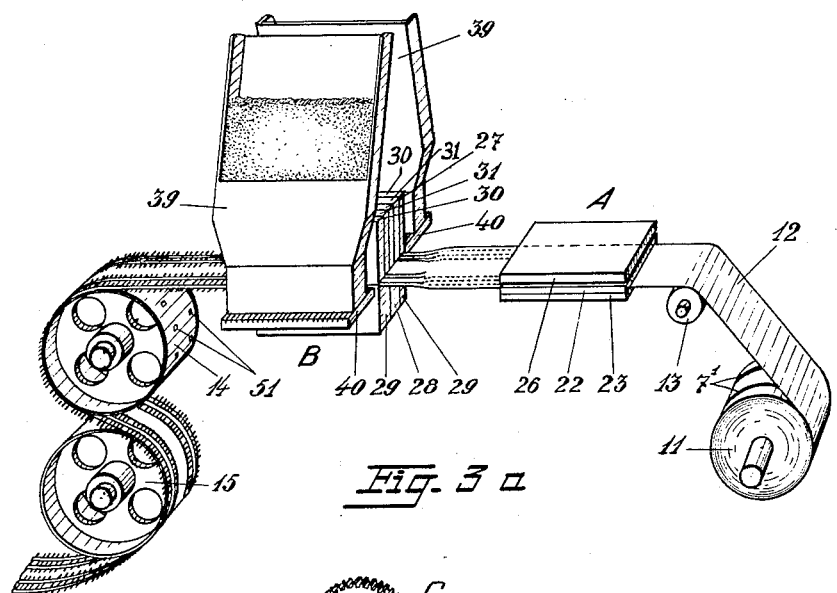
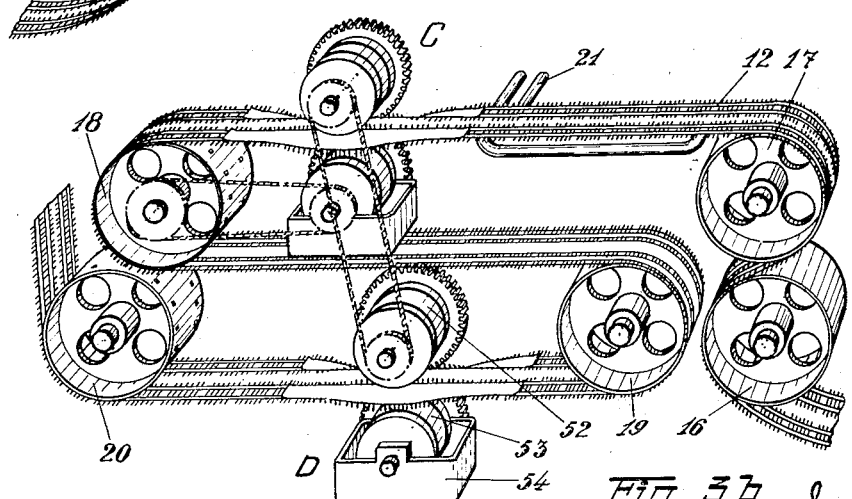

April 18, 1939. P. W. DIETMANN 2,155,118
MATCH PACKET MANUFACTURING MACHINE AND METHOD
Filed May 7, 1936 3 Sheets-Sheet 2
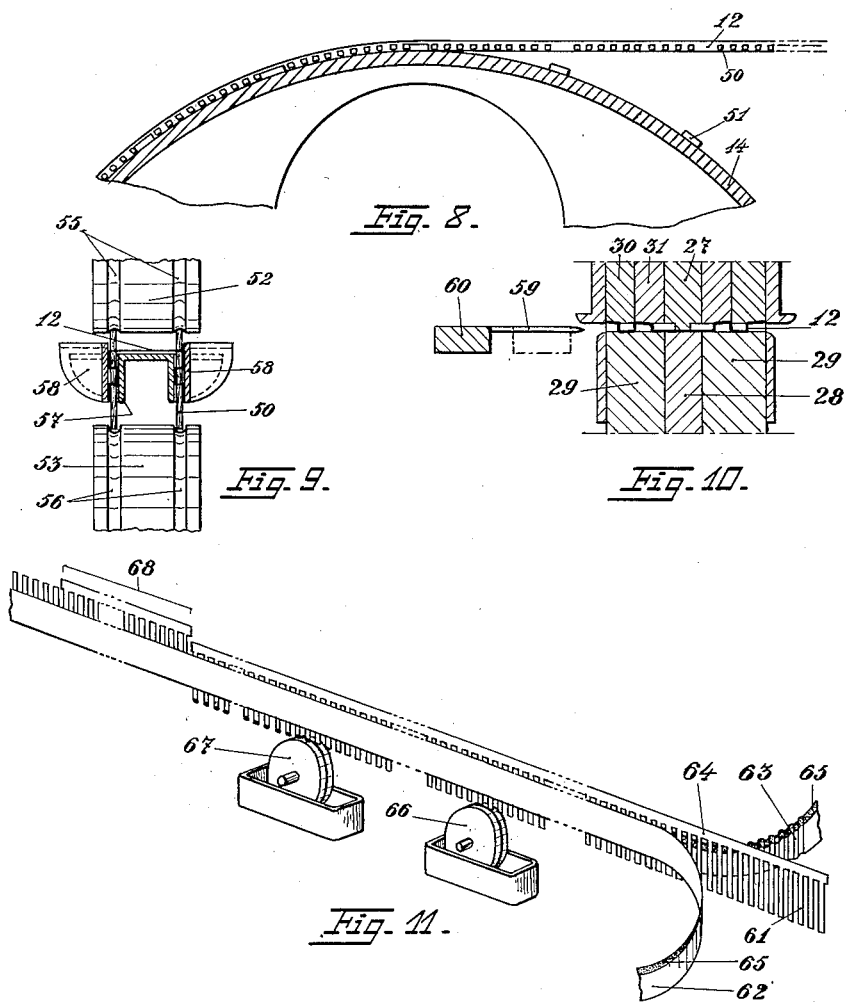

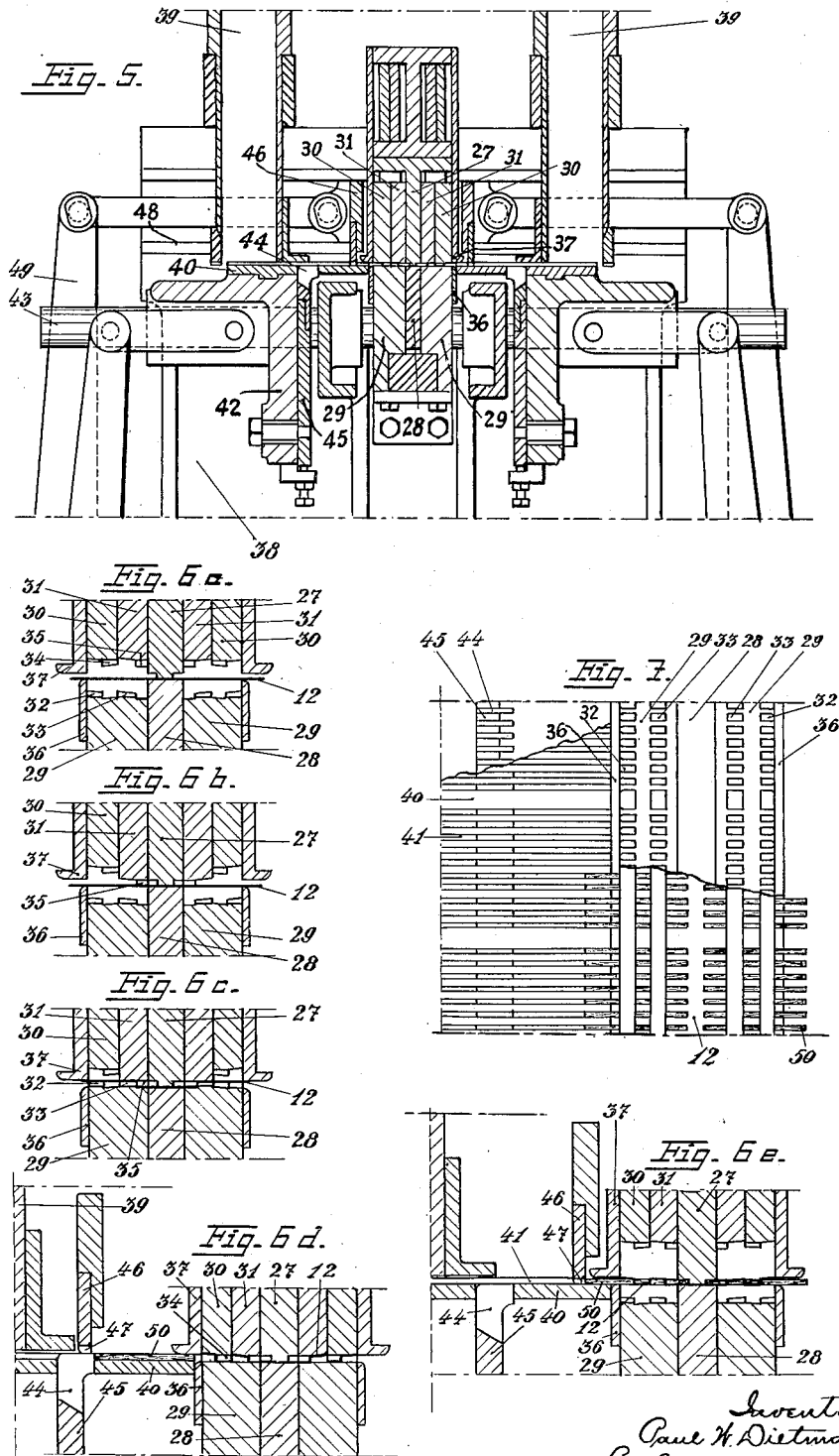

Patented Apr. 18, 1939

2,155,118

UNITED STATES PATENT OFFICE 2,155,118

MATCH PACKET MANUFACTURING MACHINE AND METHOD

Paul Wilhelm Dietmann, Jonkoping, Sweden

Application May 7, 1936, Serial No. 78,497
In Sweden May 18, 1935

20 Claims. (Cl. 93—2)

The invention relates to the manufacture of match packets of the kind, in which the matches are individually mounted in guide-ways constituted by a packeting strip of sheet material. In the manufacture of this kind of packets it has been the practice, heretofore, to place the matches in the packeting strip when already finished. This mode of operation often meets with considerable difficulties and requires relatively complicated machinery for its performance.

The present invention broadly consists in that the match splints are first placed in the guide-ways of the packeting strip and are thereafter paraffined and/or headed. Since the matches are mounted in spaced relation in the packeting strip, no special means, such as perforated carrier bars or the like, are required here for isolating the matches from one another during paraffination and dipping, respectively. If the packeting strip is advanced longitudinally past the dipping device, serving as a conveyer for the matches, the invention will be attended with a further considerable advantage, consisting in that the matches may be manufactured without the aid of any movable means whatsoever for supporting and conveying the matches during paraffination and dipping, such as dipping frames or endless splint conveyers of the kind used in continuous match-making machines. The invention, consequently, renders possible a considerable reduction and simplifying of the machinery required for the manufacture of the packages.

The invention further consists in the construction and novel combination and arrangement of parts hereinafter described, illustrated in the accompanying drawings and pointed out in the claims hereunto appended.

The invention is primarily intended for use in the manufacture of match packets of the type, wherein the guide-ways or mountings for the matches are constituted by perforations in the packeting strip, but it may be used to advantage also in the manufacture of other kinds of packages having the matches individually mounted therein, for instance packages, wherein the matches are kept in the folds of a corrugated wrapper.

The invention is illustrated by way of example in the accompanying drawings, wherein:—

Figure 1 is a perspective view of a perforated packeting strip having matches mounted therein, Figure 2 is a perspective view of a completed match packet manufactured from such packeting strip, Figures 3a and 3b are diagrammatic perspective views of a machine for the production of a match packeting strip such as that shown in Figure 1, Figure 4 is a cross-sectional view of a device, included in said machine, for perforating the strip, Figure 5 is a cross-sectional view of a mechanism for folding the strip and for inserting splints, therein, Figures 6a–e are cross-sectional views, on an enlarged scale, of part of this mechanism when in different steps of operation, Figure 7 is a plan-view corresponding to Figure 6e, Figure 8 is a detail cross-sectional view of a strip feeding means, Figure 9 is a cross-sectional view of the dipping device, and Figure 10 is a cross-section of a modified device for perforating the strip, Figure 11 illustrates diagrammatically the invention as applied in the manufacture of a match packet such as that shown in Figure 12.

Similar numerals refer to similar parts throughout the several views.

The packeting strip shown in Figure 1 may consist of common wrapping paper, and at each side of its middle line I—I it is provided with three rows of holes or perforations I extending parallel to the longitudinal direction of the strip. The portions 2, 3, 4 of the strip, containing these rows of perforations, are folded so as to form an angle with the remaining portions 5, 6, 7, 8 of the strip, in such manner, that the perforations of the various rows are located opposite to one another, each group of three rows being threaded by a row of matches 9 projecting beyond one edge of the strip with their headed ends. The matches of each row are arranged in groups of ten matches or, generally, the number of matches to be contained in the completed package, the distance between adjacent groups being larger than the distance between adjacent matches of each group. By cutting the strip on the middle line I—I and on transversal lines II—II between consecutive groups of matches, a number of strip-sections are obtained, each section containing ten matches. These sections may be used per se as match packages, but, preferably, they are pasted to a cover strip 10, Figure 2, of cardboard or any other suitable material, after the matches have been inserted so far that they are situated with their head ends under the edge-portion 5 of the strip. Preferably, the portion 7 of the strip, located between the perforated portions 3, 4, is provided with striking surface material on its side facing the matches, so that the latter are automatically ignited when being withdrawn from the guide-ways constituted by the perforations 1, but also other portions of the strip that are passed by the heads of the matches on withdrawal, may, for the same purpose, be provided with a striking surface.

In the machine shown in Figures 3a and 3b, for the manufacture of the packeting strip, a plain and unperforated strip 12 is unrolled from a bobbin 11, and advanced longitudinally in substantially horizontal loops over a plurality of guide wheels 13—20. Upon one of its sides said strip has previously been provided with longitudinal stripes 7¹ of striking surface material at locations corresponding to those of the portions 7. Correlated to succeeding locations in the course of the strip are a perforating device A for producing the six rows of holes 1, a mechanism B for folding the strip into the shape shown in Figure 1 and for inserting splints into the perforations, a heating device 21, a paraffining device C, and a dipping device D.

The perforating device A comprises two plates 22, 23, one at each side of the path of travel of the strip, said plates serving as a guide for the strip and having six rows of holes 24 provided therein for a corresponding number of grouped perforating-punches 25. These punches are fixedly mounted in a plate 26 which is moved towards and away from the plates 22, 23 by the drive of the machine.

The mechanism B comprises two plates 27, 28, positioned close to one another, one above and the other below the course of the strip, and extending in the direction of the course so as to embrace the middle portion of the strip 12. Disposed at each side of the plate 28 is a vertically movable lower tool 29, adapted to cooperate with two vertically movable upper tools 30, 31 for folding the strip and for retaining the same during the insertion of the splints. For this purpose each of the lower tools 29 is provided with two longitudinal ridges, each composed of a row of shoulders 32, 33, respectively, Figure 6a, and each of the upper tools 30, 31 has one such row of shoulders 34, 35, respectively, each located inside one of the shoulder-rows of the lower tools. The steps between the top surfaces of the shoulders that are substantially parallel to the strip, and the remaining active surfaces of the tools, facing the strip, are located just opposite the perforated portions of the strip. The shoulders of the various rows are so dimensioned that, when in the closed position shown in Figure 6d, the tools at each side of the plates 27, 28 form together a row of channels extending at right angles to the longitudinal direction of the strip at mutual distances apart, equal to those between the perforating-punches 25. Mounted close to the tools 29, 30 are pairs of guide-plates 36, 37, respectively, having opposite surfaces converging towards the mouths of the said channels. The folding mechanism constituted by the plates 27, 28, 36, 37 and the tools 29, 30, 31 is supported by a frame 38, and has a length corresponding to that occupied by a plurality of groups of perforations 1, see Figure 1. From the drive of the machine the tools 29, 30, 31 will receive a mutual motion to be described below.

At each side of the course of the strip 12 the frame 38 carries a splint magazine 39 opposite the folding mechanism just described, the bottom of said magazine being constituted by a grating 40, having a row of grooves 41 provided therein opposite the spaces between the shoulders 32, 33, 34, 35, as best shown in Figure 7, wherein the upper tools are omitted. Each grating 40 is mounted on a beam 42 that is slidably mounted on guides 43, fixed to the frame 38, and to which a reciprocating motion is imparted from the drive of the machine. Mounted on the beam 42 beneath the grating 40 is a comb 45, having teeth 44 projecting into openings in the bottoms of the grooves 41. By any suitable mechanism, which may or may not be known per se, the comb 45 is automatically raised and lowered. Extending above the path of travel of each grating 40 between each of the magazines and the folding mechanism, is an inserting comb 46 having teeth 47, positioned opposite the grooves 41. At its ends this comb is slidably mounted in guides 48 that are automatically raised and lowered by suitable mechanism not shown in the drawings. By means of linkage 49 a reciprocating motion in the direction of the grooves 41 is imparted to the comb from the drive of the machine.

While a section of the strip 12 that has been perforated by the device A, is being advanced by traction between the plates 27, 28, the tools 29, 30, 31 are in the inoperative position shown in Figure 6a, the edge-portions of the strip being supported by the guide-plates 36. After the strip has been advanced, the upper tools 31 are lowered to the position shown in Figure 6b, in which the shoulders 35 are in contact with the strip. By raising the lower tools 29 to the position shown in Figure 6c the portions 4 of the strip, see Figure 1, are hereupon folded to assume a position substantially perpendicular to the remaining portions of the strip, and the folding of the strip into the shape shown in Figure 1 is afterwards completed by lowering the upper tools 30 to the position shown in Figure 6d. Simultaneously, the part of each grating 40, situated in front of the comb 45 has moved from a position under the magazine 39 to the position shown in the drawings, whereby a row of match splints 50, descended into the grooves 41, has been delivered from each magazine and brought into the intermediate position shown in Figure 6d close to the strip 12, and this by the action of the teeth 44 occupying the raised position shown in Figure 6d. The inserting combs 46 are thereupon lowered, together with the combs 45, behind their respective rows of match splints, the teeth 47 entering the grooves 41. When the inserting combs 46 are afterwards moved in a direction towards one another to assume the position shown in Figure 6e, the match splints 50, having their foremost ends guided by the guide-plates 36, 37, are inserted into the channels formed between the upper and lower tools, thereby threading the perforations 1 of the up-folded portions 2, 3, 4 of the strip. After the beams 42 and the inserting combs 46 have been moved in a direction from one another and the tools 29, 30, 31 have been brought back to their inoperative positions, the strip will again be advanced a distance corresponding to the length of the strip-section thus supplied with match splints, whereupon the operations described are repeated with respect to the section of the strip next following.

This intermittent feed motion of the strip is imparted to it by the guide-wheel 14, said wheel having, for this purpose, a corresponding stepwise rotation imparted to it from the drive of the machine and being provided at its circumference with catches 51, see Figure 8, arranged in pairs and adapted to project into the spaces between succeeding groups of match splints between the up-folded portions 3, 4 of the strip while engaging the rearmost splint of each group. By means of the wheel 15 the strip is caused to engage approximately half the circumference of the wheel 14, so that the power required for advancing the strip is divided unto a plurality of splints. Also the guide-wheels 18 and 20 are provided with similar catches, the catches of the wheel 20 being, however, spaced such a distance apart, axially, that they will engage into the spaces between the up-folded portions 2, 3 of the strip. By the drive of the machine a continuous rotation is imparted to the wheels 18 and 20, the strip 12 serving as a differential motion compensating means between the guide-wheels 15 and 18.

Serving as a carrier and conveyer for the splints, the strip 12 is advanced by traction over the heating device 21, said device consisting, for instance, of a steam pipe loop, by which the splint ends projecting beyond the strip are preheated before being paraffined in the device C. In the embodiment shown this device is constructed in substantially the same way as is the dipping device D, comprising two rotatable cylinders 52, 53 which are mounted one above the other and are driven from the wheel 18, the lower cylinder 53 being located, with part of its circumference, in a container 54 for dipping mass. Each of the cylinders has two peripheral grooves 55, 56, respectively, provided therein, see Figure 9, the grooves of the lower cylinder of the paraffining device being each occupied by a felt-ring for taking off melted paraffin from the container. Extending between the cylinders along the path of travel of the strip 12 are a lower and two upper guide-lineals 57, 58, respectively. As the strip 12 is being advanced towards the paraffining and the dipping device by the feed-wheels 18, 20, respectively, the edge-portions of the strip, containing the match splints, will be successively folded downwards to assume a vertical position, and in this position they are maintained by the lineals while passing between the cylinders 52, 53, whereupon they are caused to resume their initial position in flush with the rest of the strip. When entering the space between the cylinders 52, 53 the upper ends of the match splints will be steadied by contacting with the bottoms of the grooves 55, so that their lower ends are brought into proper contact with the paraffin and dipping mass, respectively, contained in the grooves 56. From the guide-wheel 20 the strip with the matches thus paraffined and dipped may be passed through some suitable apparatus for drying the match heads, whereupon the strip may be cut, in the manner indicated above, to form match packages, for instance, of the type shown in Figure 2.

In its use in the manufacture of match packets wherein guide-ways for the matches are provided for by perforating the packeting strip, the invention is by no means restricted to the embodiment above set forth by way of example. With equal advantage the invention may be applied also in the manufacture of match packeting strips having two, instead of three rows of perforations for mounting matches, or having only one row of matches. The strip need not necessarily be perforated before being folded, since such perforating may take place also after the folding operations. One half of a device for this purpose, which might wholly replace the perforating device A, is shown in Figure 10, wherein 59 denotes a row of needles secured to a bar 60 located laterally of the folding mechanism and adapted to be reciprocated in the longitudinal direction of the needles. After the folding of the strip has been performed by bringing together the tools 29, 30 and 31 to the position shown, the bar 60 is moved to the position indicated in dotted lines, so that the needles will enter the channels constituted between the upper and lower tools, piercing the up-folded portions of one half of the strip. By means of a similar needle-bar, not shown in Figure 10, at the opposite side of the folding mechanism, the other half of the strip is perforated simultaneously. Furthermore, it will be possible entirely to dispense with any perforating device whatsoever, permitting, in lieu thereof, the splints themselves to pierce the paper when being advanced through the up-folded portions of the strip parallel to the plane of the strip.

In the packet shown in Figure 12 matches 61, consisting, for instance, of cardboard, are mounted in tubular guide-ways, constituted between a corrugated sheet of material 63 and a plain sheet 62 pasted thereto. According to the invention such packets may be produced as illustrated in Figure 11. A match splint strip, consisting of splints 61 integral with a common base strip 64, is advanced continuously in its longitudinal direction, being caused to engage successively with its splints into the folds of a corrugated and continuous strip 63 of sheet material applied to one side of the splint strip. From the opposite side of the splint strips a continuous, plain strip 62 is thereupon brought into contact with and pasted to the portions of the strip 63 projecting between the splints 61, so that the latter are, for a part of their length, enclosed by the composite packeting strip thus formed. Previously, the sides of the strips 62, 63 that face one another, have been provided with striking surface material 65 adjacent the edge nearest to the base strip 64. As the strip 62, 63, serving as carrier and conveyer for the matches, is being further advanced in its longitudinal direction, the free ends of the match splints, projecting beyond the strip, are brought into contact with a paraffining device 66 and a dipping device 67. After the match heads thus formed have dried, successive lengths 68 of the base strip are severed from the succeeding strip, whereupon the corresponding matches are drawn into the packeting strip 62, 63 with their heads, and the folds of the strip 62 are closed at their ends 69. After severing the base strip from the matches, complete match packages of suitable length may be cut off from the packeting strip.

In the two embodiments above described the packeting strip serves as a holder for the match splints during the dipping operation so that no special means are required for keeping them apart. Evidently, this advantage of the invention is attained also in case the packeting strip is not adapted to carry and convey the match splints, being instead, in its turn, carried by a conveyer chain or the like, movable past the dipping device.

I claim:—

1. In a method of manufacturing match packets of the character described, the steps of advancing a continuous packeting strip in a course extending in its longitudinal direction, said advancing comprising intermittent motion through a first part of the course and continuous motion through a second part of the course, inserting a plurality of individual match splints simultaneously into the packeting strip when at rest in said first part of its course, dipping the splints when in said second part of the course, inserting the splints a further distance into the strip when dipped, and cutting the strip into sections corresponding to individual packets.

2. A machine for manufacturing match packets of the character described, comprising, feed means for advancing a continuous strip in a course extending in its longitudinal direction by traction, match splint inserting mechanism at one location along said course, said feed means comprising mechanism for advancing the strip past said splint inserting mechanism with intermittent stepwise motion, said splint inserting mechanism comprising means for transversely mounting rows of match splints in said strip during periods of rest between said stepwise advancing motions of the strip, said rows corresponding in length to the length of a forward advancing step of the strip, and a match splint dipping device at a second location in the course of said strip.

3. A machine according to claim 2, wherein the feed means also comprises means for continuously advancing the strip past the splint dipping device, the strip serving as a differential motion compensating means between said dipping device and the splint inserting mechanism.

4. A machine according to claim 2, wherein said feed means comprise splint engaging tappets insertable between the match splints that extend in the transverse direction of the strip.

5. A machine according to claim 2, wherein said feed means comprise a rotatable wheel passed by the strip and having a plurality of strip engaging tappets on its circumference.

6. A machine according to claim 2, wherein the dipping device comprises two rotatable cylinders, one at each side of the course of the strip, and a container for dipping mass, one of said cylinders being adapted to act upon the splints, with its axis extending transversely to the longitudinal direction of the splints, and the opposite cylinder being capable of taking up dipping mass from the container.

7. A machine for the manufacture of a match packeting strip having matches individually mounted therein along both its edges, comprising in combination, feed means for advancing a continuous packeting strip in its longitudinal direction, mechanism at one location in the course of said strip for mounting match splints in the said strip along both its edges, a match splint dipping device at a second location in the course of the strip, and means for folding the splint carrying edge portions of the strip from the plane of the strip and maintaining them in such position during dipping.

8. A machine according to claim 7, and wherein the folding means consist of torsional guide plates positioned at both sides of the course of travel of the packeting strip.

9. In a machine for the manufacture of match packets of the character described, the combination of a mechanism for inserting match splints in their longitudinal direction into a packeting strip, a match splint dipping device, and means for advancing the strip with match splints past said dipping device, said splint inserting mechanism comprising a grooved grating for supporting the splints during the inserting operation, and an inserting comb capable of being raised and lowered relatively to the grating as well as reciprocated in the direction of the grooves, said comb having teeth insertable into the grooves for acting upon the splints resting therein.

10. A machine to be used in the manufacture of match packets of the character described, comprising in combination, members movable into contact with both sides of a packeting strip for holding the same during the insertion of splints therein, a match splint magazine opposite said holding members, means for delivering a row of splints in their longitudinal direction from the bottom of the magazine to an intermediate position adjacent said holding members, and means for inserting the same into the strip from said position, the bottom of the magazine being formed as a grating having grooves for receiving the match splints and for supporting the splints during the transfer from the magazine to the strip.

11. A machine according to claim 10, wherein the match splint delivering means comprise a vertically movable comb positioned below the grating and movable together with the same in the direction of the grooves, said comb having teeth projecting into through-openings in the bottoms of the grooves for acting upon the match splints.

12. In a mechanism for inserting match splints into a packeting strip, the combination of a match splint magazine, means for holding the strip in a position opposite said magazine during the inserting operation, means for delivering a row of splints in their longitudinal direction from the bottom of the magazine to an intermediate position adjacent said holding means, and means for inserting the splints into the strip from said position, said splint delivering means comprising a grooved grating constituting the bottom of the magazine and capable of being reciprocated in the direction of the grooves for supporting the splints during the transfer thereof from the magazine to the strip, and a vertically movable comb positioned below the grating and having teeth projecting into through-openings in the bottoms of the grooves for acting upon the match splints during their transfer to the intermediate position, and said splint inserting means comprising an inserting comb located above the path of the grating and capable of being raised and lowered relatively to the grating as well as reciprocated in the direction of the grooves, said inserting comb being adapted, after the match splints have been fed to the intermediate position, to be lowered behind the splints together with the splint delivering comb and, by subsequently being moved towards the strip, to insert the splints into the same.

13. A machine for the manufacture of match packeting strips, wherein parallel portions of the strip, having perforations serving as guide-ways for the matches, are folded to make an angle with the remaining part of the strip, comprising in combination, feed means for intermittently advancing a continuous packeting strip in its longitudinal direction, strip folding members located at each side of the course of the strip, and mechanism for inserting match splints transversely in the said strip, said folding members being, during the intervals between consecutive forward steps of the strip, movable to and from contact with the sides of the strip in order, at each time, to fold between themselves the said parallel portions of the strip for a length corresponding to that of the forward step.

14. A machine according to claim 13, wherein the folding members are located opposite the splint inserting mechanism, being adapted to hold the strip during the insertion of the match splints.

15. In a machine to be used in the manufacture of match packeting strips having parallel portions of the strip perforated to form guide-ways for the matches and folded to make an angle with the remaining part of the strip, the combination with a mechanism for inserting match splints into such folded portions of a packeting strip of sheet material, of strip folding members each of which is movable towards and away from one side of the strip to fold up said parallel portions and which are each provided, opposite the position of each such portion, with a step between two working surfaces that are substantiallly parallel to the plane of the strip.

16. A machine according to claim 15, for the manufacture of packeting strips having more than two perforated portions, wherein at least one of the folding members comprising a number of mutually movable parts, each having one step provided on it.

17. In a machine to be used in the manufacture of match packeting strips having more than two parallel portions of the strip perforated to form guide-ways for the matches and folded to make an angle with the remaining part of the strip, the combination of a mechanism for inserting match splints into such folded portions of a packeting strip, strip folding members each of which is movable towards and away from one side of the strip to fold up said parallel portions and to hold the strip in folded position during the insertion of splints therein, and longitudinal rows of shoulders on said folding members, the rows of shoulders on one of said folding members being laterally offset with respect to the rows on the other member; said folding members forming between one another a series of channels for the match splints when in closed position, one of said members comprising a plurality of movable parts, each having one row of shoulders provided on it.

18. A method in the manufacture of match packeting strips, wherein parallel portions of the strip, having perforations serving as guideways for the matches, are folded at an angle to the remaining parts of the strip, comprising the steps of advancing a continuous packeting strip in a course extending in its longitudinal direction, said advancing being intermittent through a first part of the course, folding up the said strip portions and inserting splints into the packeting strip thus folded when at rest in said first part of its course, and dipping the match splints thus inserted into the continuous packeting strip.

19. A method in the manufacture of match packets having their matches individually mounted in guide-ways constituted by perforations in a packeting strip of sheet material, comprising the steps of advancing a continuous packeting strip in a course extending in its longitudinal direction, said advancing being intermittent through a first part of the course, producing longitudinal rows of perforations in said strip when at rest at one location in said first part of its course, folding the perforated strip portions to make an angle with the rest of the strip when at rest at a succeeding location in said first part of the course, inserting match splints into the guide-ways constituted by said perforations at said succeeding location, and dipping the splints mounted in the guideways of the continuous packeting strip.

20. A machine according to claim 13, wherein is correlated to the course of the strip in advance of the folding members a punch mechanism operated in timed relation to said folding members and adapted, at each time, to perforate the strip for a length corresponding to that of the forward step.

PAUL WILHELM DIETTMANN.